United States Patent [19]

Ewen et al.

[11] Patent Number: 5,393,851
[45] Date of Patent: Feb. 28, 1995

[54] PROCESS FOR USING METALLOCENE CATALYST IN A CONTINUOUS REACTOR SYSTEM

[75] Inventors: John A. Ewen, Houston; Shabbir A. Malbari, Pasadena, both of Tex.

[73] Assignee: Fina Technology, Inc., Dallas, Tex.

[21] Appl. No.: 888,192

[22] Filed: May 26, 1992

[51] Int. Cl.$^6$ .................................................. C08F 4/64
[52] U.S. Cl. ........................................ 526/153; 526/160;
526/351; 526/904; 502/117; 502/103
[58] Field of Search ............... 526/151, 160, 904, 153

[56] References Cited

U.S. PATENT DOCUMENTS

| | | | |
|---|---|---|---|
| 4,752,597 | 6/1988 | Turner | 502/104 |
| 4,767,735 | 8/1988 | Ewen et al. | 502/109 |
| 4,769,510 | 9/1988 | Kaminsky et al. | 585/512 |
| 4,871,705 | 10/1989 | Hoel | 502/117 |
| 4,892,851 | 1/1990 | Ewen et al. | 502/104 |
| 4,912,075 | 3/1990 | Chang | 502/107 |
| 4,923,883 | 5/1990 | Kioka et al. | 502/9 |
| 4,935,474 | 6/1990 | Ewen et al. | 526/114 |
| 4,952,540 | 8/1990 | Kioka et al. | 502/9 |
| 5,132,381 | 7/1992 | Winter et al. | 526/160 |
| 5,171,799 | 12/1992 | Kioka et al. | 526/127 |

*Primary Examiner*—Joseph L. Schofer
*Assistant Examiner*—David Wu
*Attorney, Agent, or Firm*—William D. Jackson; Jim D. Wheelington; N. Norwood Cheairs

[57] ABSTRACT

The present invention provides a composition and a process wherein a metallocene catalyst is dissolved in an alumoxane which has been dissolved in a solvent to form a concentrated stock solution of metallocene-alumoxane which can be stored for at least 14 days. The metallocene-alumoxane solution is stored under an oxygen- and water-free environment and more preferably under argon at temperatures that can range from about 25 degrees Fahrenheit (−4 degrees C.) to about 85 degrees Fahrenheit (29 degrees C.). Before or at the time that the metallocene-alumoxane solution is injected into the reactor, it is diluted with a second solution comprised of either an alumoxane, an aluminum alkyl or mixtures thereof dissolved in an oleaginous solvent. The addition of the aluminum based co-catalyst serves a two fold purpose. First, it provides the aluminum necessary to enhance the catalytic reaction and second, the aluminum to metal atomic or mole ratio can be easily optimized by adjusting the amount of the second solution to establish an optimal catalyst efficiency.

The second solution either can be added to the concentrated metallocene-alumoxane solution as a side stream into the reactor or can be added directly to the metallocene-alumoxane solution prior to the time that the metallocene-alumoxane solution is injected into the reactor.

The metallocenes employed in the process are organometallic compounds which are cyclopentadienyl derivatives of a Group 4b, 5b, 6b, or 8 metal of the Periodic Table and include mono, di and tricyclopentadienyls and their derivatives of the transition metals.

28 Claims, No Drawings

PROCESS FOR USING METALLOCENE CATALYST IN A CONTINUOUS REACTOR SYSTEM

TECHNICAL FIELD

This invention relates, in general, to a composition for a concentrated metallocene catalyst solution and a process for using that concentrated metallocene catalyst solution in a continuous reactor system to polymerize propylene and other olefins.

BACKGROUND TO THE INVENTION

The use of a metallocene catalyst in combination with alumoxanes as a co-catalyst to polymerize ethylene, propylene and other olefins is well-known in the art. U.S. Pat. No. 4,769,510 (Kaminsky et al.) discloses the use of a metallocene catalyst with an alumoxane co-catalyst in polymerizing ethylene. In Kaminsky, polymerization is carried out by using a dilute solution of metallocene catalyst/alumoxane in toluene. The solution is formed by mixing 360 milligrams of methylalumoxane in 330 milliliters of toluene and then adding $3.3 \times 10^{-6}$ moles of racemic zirconium dichloride metallocene catalyst. The propylene to be polymerized is then condensed into the solution. In Kaminsky, polymerization is carried out by mixing a methylalumoxane with a zirconium dichloride catalyst and then subsequently condensing propylene into the solution. This patent does not disclose the amount of time which lapsed between the mixing of the methylalumoxane and the catalyst and the addition of the propylene to the mixture. Another patent which discloses the use of a metallocene catalyst and an alumoxane as a co-catalyst is U.S. Pat. No. 4,892,851 (Ewen et al.). Ewen et al discloses the use of a metallocene-alumoxane-co-catalyst in a process for preparing syndiotatic polyolefins.

The amounts of milligrams of catalyst used per milliliter of alumoxane and toluene ranges from one milligram of catalyst per milliliter of alumoxane in toluene to 0.05 milligrams of catalyst per one milliliter of alumoxane in toluene. The catalyst was precontacted for 20 minutes with a toluene solution containing 10.7% by weight of metallocene-alumoxane with an average molecular weight of about 1300. The catalyst and co-catalyst solution was then added to a zipper-clave reactor followed by the addition of 1 liter of liquid propylene. The polymerization reaction was then allowed to run for 60 minutes during which time the reactor was maintained at the polymerization temperature of 20 deg. C. In Ewen '851, the metallocene catalyst and alumoxane co-catalyst were mixed in toluene immediately prior to the time of its injection into a zipper-clave reactor which was then followed by the addition of the propylene. None of the examples in Ewen teach that the catalyst and co-catalyst were precontacted for more than a period of 20 minutes.

U.S. Pat. No. 4,912,075 (Chang) is yet another patent which teaches the use of a metallocene-alumoxane catalyst for the use of polymerizing olefins. In Chang, a silica gel is used as a support for the metallocene and alumoxane co-catalysts. Chang discloses a process whereby methylalumoxane in toluene was slowly added to dehydrated silica gel and was stirred for one hour at room temperature. Thereafter, 300 milliliters of a 13% weight toluene solution of zirconium dichloride catalyst was slowly added to the stirred suspension of silica gel solids and stirring continued for 0.5 hours at 75 deg. C. Thereafter, the volatile solvent was evaporated with the resulting free-flowing powder comprised of a metallocene-alumoxane catalyst complex supported on a silica gel with the ratio of aluminum to zirconium of 50:1. The free-flowing powder was then utilized as a catalyst for the gas-phase polymerization of ethylene. The process disclosed in Chang uses a support medium to pre-contact the metallocene and alumoxane. The polymerization process was carried out by adding 5 grams of the catalyst to a vile. Subsequent to that, ethylene gas was injected into the vile wherein polymerization was allowed to proceed for one hour. The process disclosed in Chang involves a metallocene/alumoxane powder and therefore is very difficult to monitor and regulate in a continuous reactor system because the powder is not in solution.

U.S. Pat. No. 4,935,474 (Ewen et al.) also discloses a process which uses a metallocene/alumoxane co-catalyst to polymerize ethylene or higher alpha olefins. In Ewen et al. '474, the alumoxane solution was injected into a vessel followed by the injection of 0.091 mg. of zirconium dimethyl metallocene catalyst dissolved in 1 milliliter of toluene and was allowed to react for 1 minute. Thereafter, ethylene was injected into the reaction vessel wherein polymerization of the ethylene occurred.

The process of using metallocene catalyst and alumoxane as a co-catalyst in Ewen et al. '474 does not disclose any systems whereby the metallocene and alumoxane as a composition can be conveniently stored in solution for long periods of time which would be an advantage for monitoring and pumping purposes in a continuous reactor system.

The use of a continuous loop reactor system in a bulk process using a heterogenous Ziegler-Natta supported catalyst system which uses an aluminum alkyl as a co-catalyst is also well known in the art. Generally, the olefin to be polymerized is continuously fed into the reactor system and serves as both monomer and diluent. When polymerization of the olefin is desired, the catalyst which is typically suspended in a suitable diluent is activated by contacting with the aluminum alkyl co-catalyst and then injected into the reactor where polymerization then occurs. The heterogeneous Ziegler-Natta catalyst systems are not preactivated because Ziegler-Natta catalysts begin decomposing within hours after being contacted with the aluminum alkyl co-catalyst.

The prior art adequately discloses both use of homogeneous metallocene-alumoxane catalyst systems and the use of the continuous loop reactor system in a bulk process with the traditional heterogeneous Ziegler-Natta-aluminum alkyl catalyst systems. However, the prior art does not describe, teach or even imply any process or composition which would provide for the metallocene and alumoxane co-catalyst to be precontacted in a concentrated solution for a long period of time. Without the advantage of having a composition of metallocene-alumoxane solution which is capable of being stored for long periods of time, the processes and compositions disclosed by the prior art make it very difficult to efficiently monitor and pump the metallocene and alumoxane solutions. This disadvantage is remedied by the present invention.

SUMMARY OF THE INVENTION

In accordance with the present invention, there is provided a composition and a process wherein a metallocene catalyst is dissolved in an alumoxane which has been dissolved in a solvent to form a concentrated stock solution of metallocene-alumoxane which can be stored for at least 14 days. Preferably the oleaginous solvent is an aromatic and more preferably is selected from the group consisting of benzene, toluene, ethylbenzene, diethylbenzene or xylene. The metallocene-alumoxane solution is stored under an oxygen- and water-free environment and more preferably under argon at temperatures that can range from about 25 degrees Fahrenheit ($-4$ degrees C.) to about 85 degrees Fahrenheit (29 degrees C.). The concentrated metallocene-alumoxane stock solution can be stored for any period of time ranging from 1 to 2 hours up to more than 14 days. Before or at the time that the metallocene-alumoxane solution is injected into the reactor, it is diluted with a second solution comprised of either an alumoxane, an aluminum alkyl or mixtures thereof dissolved in an oleaginous solvent. Preferably, the oleaginous solvent is selected from the group consisting of an alkane or aromatic solvent and more preferably is selected from the group consisting of pentane, iso-pentane, hexane, heptane, alkane, nonane, benzene, toluene, ethylbenzene, diethylbenzene or xylene. The addition of the aluminum based co-catalyst serves a two fold purpose. First, it provides the aluminum necessary to enhance the catalytic reaction and second, the aluminum to metal atomic or mole ratio can be easily optimized by adjusting the amount of the second solution to establish an optimal catalyst efficiency.

The second solution either can be added to the concentrated metallocene-alumoxane solution as a side stream into the reactor or can be added directly to the metallocene-alumoxane solution prior to the time that the metallocene-alumoxane solution is injected into the reactor.

The metallocenes employed in the process are organometallic compounds which are cyclopentadienyl derivatives of a Group 4b, 5b, 6b, or 8 metal of the Periodic Table and include mono, di and tricyclopentadienyls and their derivatives of the transition metals. Particularly desirable are metallocene complexes of a group 4b and 5b metal such as titanium, zirconium, hafnium, and vanadium. The alumoxanes employed in the process are reaction products of an aluminum trialkyl with water.

The alumoxanes are well known in the art and comprise oligomeric linear and/or cyclic alkyl alumoxanes represented by the formula R—(R—Al—O)n—AlR$_2$ for oligomeric, linear alumoxanes and (R—Al—O—)m for ligomeric, cyclic alumoxane, wherein n is 1–40, preferably 10–20, m is 3–40, preferably 3–20 and R is a $C_1$-$C_8$ alkyl group and preferably methyl.

The aluminum alkyl co-catalysts are also well known in the art and are expressed by the general formula R$_3$Al where R is a hydrocarbon radical.

DETAILED DESCRIPTION OF THE INVENTION

The present invention provides a composition and a process for storing a concentrated solution of metallocene and alumoxane in an oleaginous solvent which can be used at a much later point in time for polymerizing olefins such as ethylene and polypropylene. This long term storage capability is very advantageous in a continuous loop reactor system because it allows for the metering and pumping of the metallocene-alumoxane solution directly into the reactor system thereby providing better control over the polymerization process. Further, less decomposition of the air-sensitive metallocene structure occurs because the toluene alumoxane solution is inherently "dry" and does not require pretreatment in order to avoid decomposition. This process is advantageous over adding the metallocene as a slurry in hexane or mineral oil since plugging and caking, which cause sporadic addition problems are easily avoided by the fact that the metallocene is in a diluted solution rather than in a slurry.

A further advantage resides in the fact that the process can be operated to use only a small amount of toluene if desired by using an alkane such as heptane as the solvent for the diluting solution in place of toluene. This versatility is significant because toluene is more expensive when compared to other solvents such as heptane. In addition, toluene often contains catalyst poisons not found in heptane, i.e. results in less grams of polymer per gram of catalyst produced. With the present process, the problems associated with the use of toluene can be greatly reduced because solvents such as alkanes and more preferably heptane can be used as the solvent for the second diluting solution.

One of the more significant aspects of the present composition and process is the ability to achieve a concentrated metallocene-alumoxane stock solution which can be stored and pumped and metered as required by the polymerization process. Any disclosure or teaching of a concentrated solution of metallocene-alumoxane which can be stored for extended periods of time is noticeably absent from the prior art. Thus, it has been surprisingly found that a concentrated amount of metallocene catalysts in an alumoxane toluene solution are stable for extended periods of time. It is advantageous to use a more concentrated solution of at least 5 milliliters of metallocene catalyst per milliliter of alumoxane toluene solution. As a practical matter, this concentrated composition of metallocene-alumoxane solution requires less storage capacity for a plant operation, thereby making the overall polymerization process more efficient and cost effective. In a preferred embodiment of the invention, at least 10 milligrams of metallocene is used per milliliter of alumoxane in toluene solution. In yet another embodiment of the invention, at least 20 milligrams of metallocene per milliliter of alumoxane in toluene can be used to form the concentrated solution. Further, it has been found that metallocene catalysts are more soluble in an alumoxane toluene solution than in toluene alone. Thus, a concentrated solution of metallocene-alumoxane can now be achieved. More specifically, it has surprisingly been found that after an initial 20% loss of catalyst activity and preferably not more than a 30% loss, the resulting metallocene-alumoxane solution is stable for more than 14 days, i.e. the metallocene catalyst structure does not decompose. This is an unexpected result in view of the teachings of the prior art because typical Ziegler-Natta catalysts begin to decompose within hours after activating the catalyst with its corresponding co-catalyst. In addition, the prior art previously discussed does not give any indication that a metallocene-alumoxane solution would be stable for more than an hour. In fact, all of the examples and disclosures in that art disclose the use of the metallocene-alumoxane solution in the polymerization system most typically within 20 to 30 minutes or within 1 hour at the most. In contrast, the present invention discloses a novel process and composition for establishing a concentrated stock solution of metallocene-alumoxane which can be stored for more than 14 days and can be easily pumped and metered to achieve optimized conditions for the polymerization process.

The present composition and process also provide for the use of an aluminum alkyl such as TEAL in an oleaginous solvent as an additional co-catalyst for a metallocene catalyst system in place of the more expensive alumoxane. The aluminum alkyl can be used to replace a substantial amount of the alumoxane (e.g., up to 90%) in either the concentrated solution or in the second diluting solution. Therefore, by substituting an aluminum alkyl for an alumoxane in the solution or process, the operating cost of the polymerization process can be substantially reduced.

In one embodiment, the process is designed for use in a continuous loop-type reactor system where it is preferable to maintain a continuous flow of both the olefin and the catalyst and co-catalyst in the reactor. A concentrated solution of metallocene-alumoxane is made by placing an amount of metallocene catalyst necessary to make a saturated solution into a solvent containing an alumoxane. Preferably, the solvent for the metallocene-alumoxane solution is an aromatic solvent and more preferably, the solvent is selected from the group consisting of benzene, toluene, ethylbenzene, diethylbenzene or xylene.

The metallocenes to be used are characterized by the formula: $R''(CpR_n)(CpR'_m)MeQ_k$ wherein each Cp is a cyclopentadienyl or substituted cyclopentadienyl ring; R and R' are hydrocarbyl radical having 1-20 carbon atoms, each R may be the same or different, and each R' also may be the same or different; R'' is a structural bridge between the Cp rings imparting stereorigidity to the catalyst; Me is a group 4b, 5b, or 6b metal from the Periodic Table or Elements; each Q is a hydrocarbyl radical having 1-20 carbon atoms or is a halogen; $2 \leq k \leq 3$; $0 \leq n \leq 4$; $1 \leq m \leq 4$; and wherein $R'_m$ is selected such that $(CpR'_m)$ is a different ring than $(CpR_n)$.

Metallocene catalysts decompose very readily when exposed to the air and therefore must be kept in a substantially oxygen and water free environment i.e., where there is not enough oxygen present to cause an appreciable amount of decomposition of the metallocene catalyst, e.g. an environment in which the oxygen and water content is 1.0 ppm or less. Therefore, the concentrated solution of metallocene-alumoxane catalyst is stored under an inert gas and more preferably under argon. The temperature in which the metallocene-alumoxane is stored can range from about 25 degrees Fahrenheit to about 85 degrees Fahrenheit. Provided that the concentrated metallocene-alumoxane solution is stored under an inert atmosphere, it can be stored for more than 14 days. Because of the novel features of the metallocene-alumoxane composition and the process, the metallocene-alumoxane solution can be prepared several days prior to its actual use. The solution can be pumped from its storage container and ultimately to the reactor to be used as needed. Furthermore, since the metallocene-alumoxane is further diluted with the second diluting agent, the final diluted solution is in a physical state with allows for easy monitoring of the solution thereby increasing the overall efficiency of the polymerization process.

A second diluting solution is also prepared which is comprised of an aluminum-based catalyst which is selected from the group consisting of an alumoxane, an aluminum alkyl, or mixtures thereof. The alumoxane to be used typically has the formula as set out above for alumoxanes and the aluminum alkyl to be used typically has the formula as set above for aluminum alkyls. The alumoxane or aluminum alkyl is dissolved in an oleaginous solvent. The solvent can be an aromatic solvent such as toluene, benzene, ethylbenzene, diethylbenzene or xylene, or the solvent can be an alkane. Because of the problems associated with aromatic solvents such as toluene, it is more preferable that the diluting solvent be an alkane which can be selected from the group consisting of pentane, isopentane, hexane, heptane, octane, and nonane, and more preferably heptane. This aluminum based catalyst solution forms the diluting solvent which is used to form the dilute metallocene-alumoxane solution. The aluminum based diluting solution either can be initially added to the metallocene-alumoxane solution and thereafter introduced into the reactor, or the dilution of the concentrated metalocene-alumoxane solution can occur by separately injecting the solutions into the reactor.

Since the present invention provides a process which allows for the efficient monitoring of both the metallocene catalyst and aluminum based co-catalyst, the amount of both the metallocene and aluminum based co-catalyst can be controlled to provide the maximum aluminum to transition metal atomic ratio required to obtain the maximum aluminum efficiency. This has the advantage of lowering the cost of the process by optimizing the amount of aluminum with high metallocene efficiency. Therefore, maximum efficiency of the aluminum is essential in running an efficient polymerization process. It has been found that it is preferable to run the process where the atomic ratio of aluminum to metal is in the range of 100:1 to 5000:1 and more preferably where the range is 150:1 to 1500:1. It has also been surprisingly found that maximum aluminum efficiency is achieved where the atomic or mole ratio of aluminum to metal is in the range of 150:1 to 500:1 (Table 3). Maximum aluminum efficiency can be defined as being the atomic ratio of aluminum to metal where the maximum yield of polymer per unit weight of aluminum is obtained. A range of optimum Al/Zr ratio which achieves a maximum aluminum efficiency is not disclosed in the prior art. The prior art discloses that the grams of polymer will increase as the number of grams of alumoxane increases e.g. U.S. Pat. No. 4,892,851 (Ewen et al). However, it does not disclose an atomic ratio of aluminum to metal where the maximum yield of polymer per weight of aluminum can be obtained. In contrast, other prior art indicates that a smaller ratio of aluminum to metallocene is preferred, e.g. U.S. Pat. No. 4,752,597 (Turner).

The process discussed above can also be applied to a prepolymerization process such as described in U.S. Pat. No. 4,767,735 (Ewen et al) the entire disclosure of which is incorporated herein by reference. In a prepolymerization process, the concentrated metallocene-alumoxane solution can be prepared in advance of its use and stored in the same manner as in the polymerization process discussed above. A second solution of an aluminum based co-catalyst is also employed in the same manner as in the polymerization process discussed above. The solutions can be mixed prior to their injection into the reactor or they can be mixed by injecting them simultaneously into the reactor. After the solutions are mixed, a carrier stream of the diluted metallocene-alumoxane solution can be established in the prepolymerization reactor. Once the carrier stream is established, the olefin is injected into the carrier stream and circulated through the reactor at a residence time and at a temperature sufficient to prepolymerize the metallocene catalyst. The carrier stream containing the prepolymerized catalyst is then passed to the continuous reactor where polymerization of the olefin occurs.

The Examples below illustrate the present invention and its various advantages in more detail.

EXAMPLE 1

Isopropylidenecyclopentadienyl-1-fluorenylzirconiumdichloride (iPr(Cp)(Flu)ZrCl2) was checked for purity by proton NMR. 9.9% Alumoxane in toluene (4.7% Al, 1100 av. mol. wt) supplied by Schering Corporation was used. Alumoxane in heptane (7.1% Al, 0.73 gm. ml) supplied by Texas Alkyls was also used. The stock solutions were prepared and stored in a Vacuum Atmospheres glove box under argon at 28 degrees C. 8 ml of 9.9% alumoxane in toluene was syringed into a 20 ml glass bottle. Red iPr(Cp)(Flu)ZrCl$_2$ was added to make a saturated dark purple solution (200 mg, 25 mg/ml). A saturated solution of iPr(Cp)(Flu)ZrCl$_2$ in alumoxane in heptane was prepared in a 20 ml glass bottle (2.9 mg/ml).

Polymerizations

An aliquot of the metallocene-alumoxane stock solution (equivalent to 0.5 mg of iPr(Cp)(Flu)ZrCl$_2$) was diluted with additional alumoxane to give an Al/Zr mole ratio of 5,000. The catalyst was charged to the reactor by pumping 200 ml of propylene through a stainless steel catalyst sample bomb into a 2 L Zipperclave containing 1200 ml of propylene stirring at 30 degrees C. The reaction temperature was increased to 60 degrees C. within 5 minutes. After stirring at 60 degrees C. for 1 hours, the reactor was vented and the contents dried in a vacuum oven overnight.

Results

The saturation point for the two alumoxane solutions were approximately 25 mg/ml of 9.9% alumoxane in toluene and 2.7 mg/ml alumoxane in heptane. After an initial 20% loss in catalyst activity, metallocene in 9.9% alumoxane in toluene solution was stable at 28 degrees C. for at least 14 days. (Table 1). A more dilute stock solution (13.2 mg/ml) was also stable under these conditions. Table 1 also shows that the rate of decomposition resulting in the 20% efficiency loss was decreased by storing the stock solution at −3 degrees C. In contrast, metallocene in alumoxane heptane solutions decomposed to low activity amber colored solution within 24 hours at 28 degrees C. (Table 1). Storage at −3 degrees C. did not slow down the decomposition rate significantly.

EXAMPLE 2

A constant amount of a concentrated iPr(Cp)(Flu)ZrCl$_2$—9.9% alumoxane in toluene was added to either additional alumoxane in heptane or additional alumoxane in toluene immediately before charging to the reactor. The concentrated solution was prepared by dissolving 100 mg of iPr(Cp)(Flu)ZrCl$_2$ in 8 ml of 9.9% alumoxane in toluene. The solution was stored at 28 degrees C. in a Vacuum Atmospheres glove box.

Polymerization 0.1 ml of the metallocene-alumoxane stock solution (equivalent to 1.25 mg of iPr(cp)(Flu)ZrCl2 was diluted with an amount of alumoxane solution in either toluene or heptane. The catalyst complex was added to the reactor by pumping 200 ml of propylene through the catalyst bomb into a 2 L Zipperclave containing 1200 ml of propylene stirring at 30 degrees C. The reaction temperature was increased to 60 degrees C. within 5 minutes. After stirring at 60 degrees C. for 30 minutes, the reactor was vented and the contents dried in a vacuum oven. The results are reported in Table 2.

TABLE 1

| STORAGE TEMPERATURE °C. | SOLUTION AGE DAY | YIELD gm |
|---|---|---|
| 28 | 0 | 160 |
| 28 | 1 | 130 |
| 28 | 9 | 115 |
| 28 | 12 | 160 |
| 28 | 14 | 160 |
| −3 | 0 | 160 |
| −3 | 4 | 160 |
| −3 | 11 | 160 |

Stock Solution: 13.2 mg. cat/ml. of 10% alumoxane in toluene under argon.

TABLE 2

| Catalyst Effic., Amount, mg | Alumoxane Type (mg-Al) | Al/Zr mole ratio | Yield, gm | Effic., Kg/g-Al | Kg/g-Cat |
|---|---|---|---|---|---|
| 1.25 | in Heptane (39) | 497 | 20 | .51 | 16.0 |
| 1.25 | in Heptane (65) | 828 | 76 | 1.17 | 60.8 |
| 1.25 | in Heptane (130) | 1655 | 122 | 0.94 | 97.6 |
| 1.25 | in Heptane (260) | 2931 | 153 | 0.67 | 122.4 |
| 1.25 | in Toluene (30) | 379 | 28 | 0.93 | 22.4 |
| 1.25 | in Toluene (51) | 655 | 56 | 1.10 | 44.8 |
| 1.25 | in Toluene (103) | 1310 | 132 | 1.28 | 105.6 |
| 1.25 | in Toluene (206) | 2621 | 195 | 0.95 | 156.0 |

0.1 mL stock solution (12.5 mg iPr[Cp(Flu)ZrCl$_2$/ml MAO in toluene), 1400 mL propylene, 60° C. polymerization for 30 min. Alumoxane in heptane = 7.1 wt % Al, density of 0.71. Alumoxane in toluene = 4.7 wt % Al, density of 0.87.

TABLE 3

| Catalyst Effic., Amount, mg | Alumoxane Type (mg-Al) | Al/Zr mole ratio | Yield, gm | Effic., Kg/g-Al | Kg/g-Cat |
|---|---|---|---|---|---|
| 1.25 | in Heptane (65) | 831 | 313 | 4.8 | 250.4 |
| 1.88 | in Heptane (39) | 335 | 273 | 7.0 | 145.6 |
| 2.50 | in Heptane (26) | 166 | 187 | 7.2 | 74.8 |
| 3.75 | in Heptane (26) | 110 | 135 | 5.2 | 36.0 |

Catalyst stock solution = 12.5 mg iPr(CP)(Flu)ZrCl$_2$/mL MAO in toluene. 1400 mL propylene, 60° C. polymerization for 2 h. Alumoxane in toluene = 4.7 wt % Al, density of 0.87. Alumoxane in heptane = 7.1 wt % Al, density = 0.71 g/mL.

Having described specific embodiments of the present invention, it is understood that various modifications thereof may be suggested to those skilled in the art, and it is intended to cover all such modifications as fall within the scope of the appended claims.

What is claimed:

1. In a process for the polymerization of an olefin in a continuous-type reactor system employing a metallocene-alumoxane catalyst system, the improvement comprising:
   (a) preparing a concentrate catalyst solution comprising a metallocene catalyst and an alumoxane co-catalyst in an oleaginous solvent;
   (b) preparing a secondary solution comprising an aluminum-based co-catalyst selected from the group consisting of an alumone, an aluminum alkyl, and mixtures thereof in an oleaginous solvent;

(c) maintaining said concentrate solution of metallocene and alumoxane under an oxygen-free environment for a period of more than two hours after the preparation of said solution in accordance with step (a);

(d) subsequent to steps (b) and (c), forming a dilute metallocene-alumoxane solution by establishing a dilute metallocene-alumoxane solution within said reactor system by mixing the solutions of step (a) and (b); and (e) immediately after the formation of said dilute solution, injecting the said dilute solution into said continuous type reactor system concomitantly with the injection of an olefin into said reactor system.

2. The process of claim 1 wherein the metallocene catalyst is characterized by the formula:

R''(CpR$_n$)(CpR'$_m$))MeQ$_k$ wherein each Cp is a cyclopentadienyl or substituted cyclopentadienyl ring; R and R' are hydrocarbyl radicals each having 1–20 carbon atoms, each R may be the same or different, and each R' also may be the same or different; R'' is a structural bridge between the Cp rings imparting stereorigidity to the catalyst; Me is a group 4b, 5b, or 6b metal from the Periodic Table or Elements; each Q is a hydrocarbyl radical having 1–20 carbon atoms or is a halogen; $2 \leq k \leq 3$; $0 \leq n \leq 4$; $1 \leq m \leq 4$; and wherein R' is selected such that (CpR'$_m$) is a sterically different ring than (CpR$_n$).

3. The process of claim 1, further comprising the step subsequent to step (d) and prior to step (e), contacting said dilute solution with an olefin to prepolymerize said catalyst and thereafter injecting said prepolymerized dilute catalyst solution into said reactor system in accordance with step (e).

4. The process of claim 1, wherein said concentrated solution is stored in accordance with step (c) for at least one day.

5. The process of claim 1, wherein said alumoxane is characterized by the general formula (R—Al—O)$_m$ in the cyclic form or R(R—Al—O)$_n$—AlR$_2$ in the linear form wherein R is an alkyl group with one to eight carbon atoms, M is an integer from 3–40, and n is an integer from 1–40.

6. The process of claim 1 wherein said aluminum alkyl is characterized by the general formula R$_3$Al wherein R is a hydrocarbon radical.

7. The process of claim 1 wherein the secondary solution is an alkyl aluminum in an oleaginous solvent.

8. The process of claim 1 wherein the solvent in which said concentrate solution of metallocene and alumoxane is mixed is an aromatic solvent.

9. The process of claim 1 wherein the solvent in which said secondary solution is mixed is selected from the group consisting of an alkane solvent and an aromatic solvent.

10. The process of claim 1 wherein said secondary solution is an aluminum alkyl selected from the group consisting of aluminum triethyl, aluminum tri-isobutyl, aluminum trimethyl, and aluminum trioctyl.

11. The process of claim 1 wherein the solvent in which said concentrate solution of metallocene and alumoxane is mixed is selected from the group consisting of benzene, toluene, ethylbenzene, diethylbenzene and xylene.

12. The process of claim 1, wherein the solvent of said secondary alumoxane solution is selected from the group consisting of pentane, iso-pentane, hexane, heptane, octane, nonane, benzene, toluene, ethylbenzene, diethylbenzene and xylene.

13. The process of claim 1 wherein the said diluted metallocene-alumoxane solution forms an aluminum to metal atomic ratio and the metal is selected from the group consisting of titanium, zirconium and hafnium.

14. The process of claim 13 wherein the said atomic ratio of aluminum to metal is in the range of 100:1 to 5000:1.

15. The process of claim 13 wherein a maximum aluminum efficiency occurs where the atomic ratio of aluminum to metal is in the range of 150:1 to 500:1.

16. The process of claim 13 wherein, said atomic ratio is in the range of 150:1 to 1500:1.

17. The process of claim 1 wherein said concentrate is stored under argon at temperatures that range from about 25 degrees F. to about 85 degrees F.

18. The process of claim 1 wherein the dilute solution of step (d) is established by separately injecting the solution of step (a) and (b) into said reactor system.

19. The process of claim 1 wherein said dilute solution of step (d) is established by the initial mixing of the solution of step (a) and (b) to form said dilute solution and thereafter introducing said dilute solution into said reactor system.

20. In a process for the polymerization of an olefin in a continuous-type reactor system employing a metallocene-alumoxane catalyst system, the improvement comprising:

a) preparing a concentrate catalyst solution comprising a metallocene catalyst and a 9.9% alumoxane co-catalyst in an oleaginous solvent wherein, the metallocene catalyst is isopropylidenecyclopentadienyl-1-fluorenylzirconium dichlofide and the oleaginous solvent is toluene;

b) preparing a secondary solution comprising an aluminum based catalyst selected from the group consisting of an alumoxane, an aluminum alkyl, and mixtures thereof in an oleaginous solvent wherein the solvent is heptane;

c) maintaining said concentrate solution of metallocene and alumoxane under argon for a period of at least one hour after the preparation of said solution in accordance with step (a) under temperatures that range from about 25 degrees F. to about 85 degrees F.;

d) subsequent to steps Co) and (c), forming a dilute metallocene-alumoxane solution by mixing said concentrate solution with said secondary solution; and e) immediately after the formation of said dilute solution, injecting said dilute solution into said continuous type reactor system concomitantly with the injection of an olefin into said reactor system.

21. In a process for the polymerization of an olefin in a continuous-type reactor system employing a metallocene-alumoxane catalyst system, the improvement comprising:

a) preparing a concentrate catalyst solution comprising a metallocene catalyst and an alumoxane co-catalyst in an oleaginous solvent in which said catalyst and co-catalyst are sufficiently stable whereby the activity of said catalyst degrades no more than about 30% in one day;

b) preparing a secondary solution comprising an aluminum based catalyst selected from the group consisting of an alumoxane, an aluminum alkyl, and mixtures thereof in an oleaginous solvent;

c) maintaining said concentrate solution of metallocene and alumoxane under an oxygen-free environment for a period of more than two hours after the preparation of said solution in accordance with step (a);

d) subsequent to steps b and c, forming a dilute metallocene-alumoxane solution by mixing said concentrate solution with said secondary solution; and e) immediately after the formation of said dilute solution, injecting the said diluted metallocene-alumoxane catalyst solution into a continuous type reactor system concomitantly with the injection of an olefin into said reactor system.

22. In a process for the polymerization of an olefin in a continuous-type reactor system employing a metallocene-alumoxane catalyst system, the improvement comprising:

(a) preparing a concentrate catalyst solution comprising a metallocene catalyst and an alumoxane co-catalyst in an oleaginous solvent;

(b) preparing a secondary solution comprising an aluminum-based co-catalyst selected from the group consisting of an alumoxane, an aluminum alkyl and mixtures thereof in an oleaginous solvent;

(c) maintaining said concentrate solution of metallocene and alumoxane under an oxygen-free environment for a period within the range of two hours to fourteen days after the preparation of said solution in accordance with step (a); and (d) subsequent to steps (b) and (c), forming a dilute metallocene-alumoxane solution by establishing a dilute metallocene alumoxane solution within said reactor system by mixing the solutions of step (a) and (b); and (e) immediately after the formation of said dilute solution, injecting said dilute solution into said continuous type reactor system concomitantly with the injection of an olefin into said reactor system (f) maintaining temperature and residence time conditions in said reactor system to carry out the polymerization of the said olefin; and (g) removing said polymerized olefin from said continuous type reactor system.

23. The process of claim 22 wherein said metallocene catalyst is present in said concentrate catalyst solution in an amount of at least 10 mg of metallocene per ml of said solution.

24. The process of claim 22 wherein said metallocene catalyst is present in said concentrate catalyst solution in an amount of at least 20 mg of metallocene per ml of said solution.

25. The process in claim 22 wherein the concentrate catalyst solution comprising a metallocene catalyst and an alumoxane co-catalyst in an oleaginous solvent includes an aluminum alkyl.

26. The process of claim 22, further comprising the step subsequent to step (d) and prior to step (e), of contacting the said dilute metallocene-alumoxane solution with the said olefin in continuous flow reactor under conditions sufficient to prepolymerize said metallocene catalyst and passing the said prepolymerized metallocene into the said reactor.

27. The process of claim 22 wherein the dilute solution of step d is established by separately injecting the solution of step a and b into said reactor.

28. The process of claim 22 wherein said dilute solution of step d is established by the initial mixing of the solution of step a and b to form said dilute solution and thereafter introducing said dilute solution into said reactor.

* * * * *